US012811945B2

(12) United States Patent
Kleiner et al.

(10) Patent No.: US 12,811,945 B2
(45) Date of Patent: Nov. 24, 2026

(54) AUTOMATED USER ACCESS MANAGEMENT FOR WEB-BASED APPLICATIONS

(71) Applicant: SAILPOINT TECHNOLOGIES, INC., Wilmington, DE (US)

(72) Inventors: Eldar Kleiner, Tel Aviv (IL); David Ben Zakai, Ramat Gan (IL); Daniel Parolla, Rosh-HaAyin (IL); Timor Eizenman, Tel Aviv-Jaffa (IL)

(73) Assignee: SAILPOINT TECHNOLOGIES, INC., Wilmington, DE (US)

( * ) Notice: Subject to any disclaimer, the term of this patent is extended or adjusted under 35 U.S.C. 154(b) by 85 days.

(21) Appl. No.: 18/908,924

(22) Filed: Oct. 8, 2024

(65) Prior Publication Data

US 2026/0100953 A1 Apr. 9, 2026

(51) Int. Cl.
*H04L 9/40* (2022.01)

(52) U.S. Cl.
CPC .......... *H04L 63/102* (2013.01); *H04L 63/105* (2013.01)

(58) Field of Classification Search
CPC ............................ H04L 63/102; H04L 63/105
See application file for complete search history.

(56) References Cited

U.S. PATENT DOCUMENTS

| | | | |
|---|---|---|---|
| 7,725,931 B2 | 5/2010 | Ito | |
| 7,784,044 B2 | 8/2010 | Buban | |
| 7,865,931 B1 * | 1/2011 | Stone | G06F 21/31 726/17 |
| 8,578,499 B1 | 11/2013 | Zhu et al. | |
| 8,607,208 B1 | 12/2013 | Arnold | |
| 8,769,637 B2 | 7/2014 | Janzen | |
| 9,191,381 B1 | 11/2015 | Popp et al. | |
| 9,241,004 B1 | 1/2016 | April | |
| 9,251,114 B1 | 2/2016 | Ancin | |
| 9,384,345 B2 | 7/2016 | Dixon et al. | |
| 9,576,070 B2 | 2/2017 | Steiner | |
| 9,635,042 B2 | 4/2017 | Brown et al. | |
| 9,674,145 B2 | 6/2017 | Chien | |
| 10,257,182 B2 | 4/2019 | Child et al. | |
| 10,805,314 B2 | 10/2020 | Jakobsson et al. | |
| 10,904,218 B2 | 1/2021 | Muttik | |

(Continued)

FOREIGN PATENT DOCUMENTS

| | | |
|---|---|---|
| CN | 103942073 | 12/2017 |
| EP | 3422236 B1 | 6/2022 |
| WO | WO 2019237590 | 12/2019 |

OTHER PUBLICATIONS

Notice of Allowance for U.S. Appl. No. 18/325,019, mailed Dec. 18, 2025, 6 pgs.

(Continued)

*Primary Examiner* — Meng Li
(74) *Attorney, Agent, or Firm* — Sprinkle IP Law Group

(57) ABSTRACT

A method includes, in a browser running on a computing device, detecting that an administrator of a given web-based application (WBA) among multiple WBAs, has logged-in to the given WBA. While the administrator is logged-in: (i) a user whose access privileges to the given WBA are required to be changed is automatically identified, and (ii) the access privileges of the user in the given WBA by the browser, are changed on behalf of the logged-in administrator.

20 Claims, 2 Drawing Sheets

(56) References Cited

U.S. PATENT DOCUMENTS

| | | | | |
|---|---|---|---|---|
| 11,089,005 | B2 | 8/2021 | Ford et al. | |
| 11,178,188 | B1 | 11/2021 | Wu et al. | |
| 11,295,029 | B1 | 4/2022 | Greenblatt | |
| 11,405,398 | B2 * | 8/2022 | Sakamoto | G06F 21/604 |
| 11,537,706 | B1 | 12/2022 | Sharifi Mehr | |
| 11,831,617 | B2 | 11/2023 | Lewin | |
| 11,979,383 | B1 | 5/2024 | Litty | |
| 12,277,209 | B2 | 4/2025 | Ben Zakai | |
| 12,561,128 | B2 | 2/2026 | Zakai | |
| 12,664,248 | B2 | 6/2026 | Zakai | |
| 2004/0064469 | A1 * | 4/2004 | Takahashi | H04L 63/102 |
| 2008/0320151 | A1 | 12/2008 | McCanne | |
| 2010/0186088 | A1 | 7/2010 | Banerjee et al. | |
| 2010/0250779 | A1 | 9/2010 | B'far et al. | |
| 2011/0296509 | A1 | 12/2011 | Todorov | |
| 2014/0068733 | A1 | 3/2014 | Belsario | |
| 2014/0298403 | A1 | 10/2014 | Qureshi | |
| 2015/0067760 | A1 | 3/2015 | Waltermann et al. | |
| 2015/0074390 | A1 | 3/2015 | Stoback et al. | |
| 2015/0089228 | A1 | 3/2015 | Kim | |
| 2015/0123983 | A1 | 5/2015 | Schoening | |
| 2015/0304302 | A1 | 10/2015 | Zhang | |
| 2016/0352861 | A1 * | 12/2016 | White | H04L 67/02 |
| 2017/0126653 | A1 | 5/2017 | Lupien | |
| 2017/0264612 | A1 | 9/2017 | Kaushal et al. | |
| 2017/0317828 | A1 | 11/2017 | Reinhold | |
| 2018/0077138 | A1 | 3/2018 | Bansal et al. | |
| 2018/0091453 | A1 | 3/2018 | Jakobsson | |
| 2018/0213059 | A1 * | 7/2018 | Alsina | H04L 67/55 |
| 2019/0020646 | A1 | 1/2019 | Magyar | |
| 2019/0220590 | A1 | 7/2019 | De Jonge | |
| 2019/0347667 | A1 | 11/2019 | Zhang | |
| 2020/0097337 | A1 | 3/2020 | Borkar et al. | |
| 2020/0162454 | A1 | 5/2020 | Jain et al. | |
| 2020/0177637 | A1 | 6/2020 | Narayanaswamy | |
| 2020/0213336 | A1 | 7/2020 | Yu et al. | |
| 2020/0380115 | A1 | 12/2020 | Knight et al. | |
| 2021/0306315 | A1 | 9/2021 | Wright | |
| 2021/0400032 | A1 | 12/2021 | Ryu | |
| 2022/0385671 | A1 * | 12/2022 | Silverstein | H04L 63/1408 |
| 2023/0013371 | A1 | 1/2023 | Liu | |
| 2023/0078849 | A1 | 3/2023 | Seletskiy et al. | |
| 2023/0115553 | A1 | 4/2023 | Ricchuiti | |
| 2023/0315835 | A1 | 10/2023 | Hangzhou et al. | |
| 2023/0401308 | A1 | 12/2023 | Ben Zakai et al. | |
| 2023/0409680 | A1 | 12/2023 | Blachman et al. | |
| 2024/0061673 | A1 | 2/2024 | Ben Zakai et al. | |
| 2024/0267210 | A1 | 8/2024 | Liang | |
| 2024/0403405 | A1 | 12/2024 | Ben Zakai et al. | |
| 2024/0403408 | A1 | 12/2024 | Murata | |
| 2025/0021692 | A1 | 1/2025 | Bachar et al. | |
| 2025/0053642 | A1 | 2/2025 | Ben Zakai | |
| 2025/0184354 | A1 | 6/2025 | Edwards et al. | |
| 2025/0307378 | A1 | 10/2025 | Kleiner | |
| 2026/0073028 | A1 * | 3/2026 | Belgi | G06F 21/31 |
| 2026/0100953 | A1 * | 4/2026 | Kleiner | H04L 63/102 |
| 2026/0106871 | A1 | 4/2026 | Kleiner | |
| 2026/0154064 | A1 | 6/2026 | Zakai | |
| 2026/0211995 | A1 | 7/2026 | Zakai | |

OTHER PUBLICATIONS

Office Action for U.S. Appl. No. 18/617,706, mailed Feb. 6, 2026, 19 pgs.
Office Action for U.S. Appl. No. 18/914,179, mailed Feb. 9, 2026, 13 pgs.
Office Action for U.S. Appl. No. 18/915,395, mailed Mar. 17, 2026, 21 pgs.
Office Action for U.S. Appl. No. 18/498,111, dated Jul. 9, 2025, 30 pgs.
Notice of Allowance for U.S. Appl. No. 18/498,111, mailed Dec. 9, 2025, 6 pgs.
U.S. Appl. No. 17/839,550 Office Action dated Aug. 29, 2024.
Stackoverflor, "Configure Silent Authentication in Open ID Connect", pp. 1-2, Aug. 11, 2020, as downloaded from https://stackoverflow.com/questions/63351761/configure-silent-authentication-in-open-id-connect.
Meta, "Silent authentication on session expiration with oAuth2 plugin", p. 1, Jan. 30, 2023, as downloaded from https://meta.discourse.org/t/silent-authentication-on-session-expiration-with-oauth2-plugin/253349.
Chrome Developers, "User identification", pp. 1-10, May 14, 2018, as downloadd from https://developer.chrome.com/docs/apps/app_identity/.
Wikipedia, "Salt (cryptography)," pp. 1-3, last edited Feb. 21, 2024.
mozilla.org, "Web APIs—FileReaderSync," mdn web docs, pp. 1-3, years 1998-2024, as downloaded from https://developer.mozilla.org/en-US/docs/Web/API/FileReaderSync.
mozilla.org, "Web APIs—File," mdn web docs, pp. 1-3, years 1998-2024, as downloaded from https://developer.mozilla. org/en-US/docs/Web/API/File.
Wikipedia, "NTFS," pp. 1-27, last edited May 30, 2024.
Microsoft, "Microsoft Information Protection (MIP) SDK—setup and configuration," pp. 1-11, Jan. 30, 2024.
U.S. Appl. No. 18/325,019 Non-Final Office Action dated Apr. 9, 2025.
U.S. Appl. No. 18/617,706 Non-Final Office Action dated Aug. 29, 2024.
ISR—WOSA # PCTIB2023054512, dated Jul. 30, 2023.
Notice of Allowance for U.S. Appl. No. 18/325,019, mailed May 6, 2026, 6 pgs.
Office Action for U.S. Appl. No. 18/914,179, mailed Jul. 7, 2026, 13 pgs.
Office Action for U.S. Appl. No. 18/617,706, mailed Jul. 7, 2026, 16 pgs.
Office Action for U.S. Appl. No. 18/915,395, mailed Jul. 28, 2026, 23 pgs.

* cited by examiner

AUTOMATED USER ACCESS MANAGEMENT FOR WEB-BASED APPLICATIONS

FIELD OF THE INVENTION

The present invention relates generally to security of web-based applications, and particularly to methods and systems for automating access management of users in web-based applications.

BACKGROUND OF THE INVENTION

Organizations, such as corporations, typically use web-based applications (WBAs). Authorized users of a WBA are determined by their line of business, and the access of those users to the WBA and the information linked to it is managed by the WBA administrator, typically manually. For example, when a given user of a given WBA leaves the organization, the application administrator should remove from the given WBA the access credentials of the account associated with the given user.

The manual nature of user account management in WBAs is prone to mistakes, and in some cases, may result in a breach of information security in the organization. Therefore, it is important to create a system that will prevent errors in managing user accounts in WBAs and thus, prevent breaches and improve the information security in such organizations.

SUMMARY OF THE INVENTION

An embodiment of the present invention that is described herein provides a method including in a browser running on a computing device, detecting that an administrator of a given web-based application (WBA) among multiple WBAs, has logged-in to the given WBA. While the administrator is logged-in: (i) a user whose access privileges to the given WBA are required to be changed is automatically identified, and (ii) the access privileges of the user in the given WBA by the browser, are changed on behalf of the logged-in administrator.

In some embodiments, in logging-in, the administrator initiates a secure session with the given WBA, and changing the access privileges is performed as part of the secure session. In other embodiments, automatically identifying the user includes: (i) sending from the browser to a server, in response to detecting that the administrator has logged-in, a query for users that are associated with the given WBA and whose access privileges are required to be changed, and (ii) receiving from the server information relating to the user in response to the query. In yet other embodiments, changing the access privileges includes automatically changing the access privileges on behalf of the logged-in administrator using a cookie to authenticate the administrator.

In some embodiments, all the users and their respective privileges are identified, and the users whose access privileges are required to be changed are selected from among all the users, and their access privilege is changed as part of the secure session. For example, some of the users may no longer be working in an organization using the given WBA, and in such embodiments, such users are identified and are removed from the list of users of the given WBA.

In some embodiments, automatically changing the access privileges includes: (i) in response to detecting that the administrator has logged-in, obtaining from a server to the browser, access-management Application Programming Interface (API) information of the given WBA, and (ii) accessing the given WBA using the obtained access-management API information. In other embodiments, changing the access privileges includes displaying, to the administrator, a message indicative of the user whose access privileges to the given WBA are required to be changed. In yet other embodiments, the method includes providing the administrator with instructions for changing the access privileges of the user in the given WBA.

In some embodiments, changing the access privileges includes deleting the access privileges of the user to the given WBA. In other embodiments, changing the access privileges includes granting the user new access privileges to the given WBA. In yet other embodiments, the access privileges include: (i) a first level of access privileges granting the user to perform a first set of operations in the given WBA, and (ii) a second level of access privileges granting the user to perform a second set of operations in the given WBA, different from the first set, and changing the access privileges includes changing the access privileges of the user from the first level to the second level.

There is additionally provided, in accordance with an embodiment of the present invention, a system including (i) a network interface, which is configured to communicate over a data network with one or more web-based applications (WBAs), and (ii) a processor, which is configured to run a browser, and detect in the browser that an administrator, of a given web-based application (WBA) among the WBAs, has logged-in to the given WBA, and while the administrator is logged-in: the processor is configured to: (a) automatically identify a user whose access privileges to the given WBA are required to be changed, and (b) change, via the network interface, the access privileges of the user in the given WBA by the browser, on behalf of the logged-in administrator.

BRIEF DESCRIPTION OF THE DRAWINGS

The present invention will be more fully understood from the following detailed description of the embodiments thereof, taken together with the drawings in which.

DETAILED DESCRIPTION OF EMBODIMENTS

Overview

Figure 1:
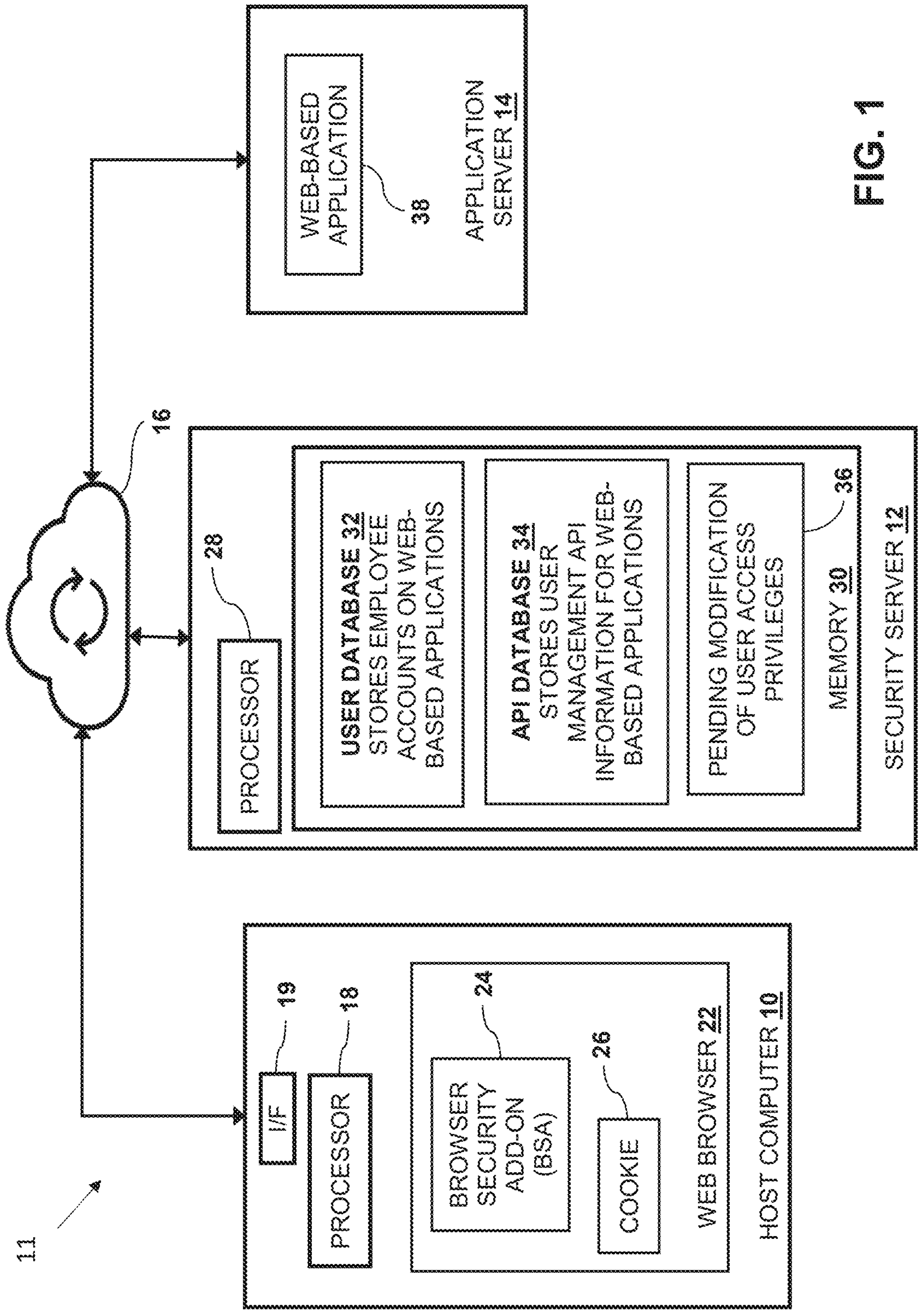
FIG. 1 is a block diagram that schematically illustrates a system for managing user access in web-based applications, in accordance with an embodiment of the present invention.

Entities (e.g., employees) in various departments of organizations (e.g., corporations) use different web-based applications (WBAs) that are running on one or more application servers. Management of user accounts in such WBAs, which is typically manual, is prone to errors and in some cases, may result in a breach of information security in the organization.

Embodiments of the present invention that are described herein provide improved methods and systems for preventing errors in management of user accounts in WBAs. For example, the disclosed techniques may be used to automate removal of a user's credentials from one or more WBAs when the user (e.g., an employee) leaves the organization, as well as other modifications of user accounts in WBAs, which are described below.

In some embodiments, a system for automatic management of user accounts in multiple WBAs comprises a security server having two databases. The first database maps each user account to one or more WBAs that the user is authorized to access and use. The second database comprises a list, for a set of multiple WBAs, of application programming interface (API) calls that can be used to manage access of users to each of the WBAs. The security server is further configured to store and update a list comprising pending modifications of user access privileges. A full description of an example implementation of the system is provided in detail in FIG. 1 below, and an example method for implementing the present invention in the example system is provided in detail in FIG. 2 below.

In some embodiments, in a browser running on a computing device (e.g., a computer or a smartphone) having granted permission, the system is configured to detect that an administrator of a given WBA (among the multiple WBAs) has logged-in to the given WBA.

In some embodiments, while the administrator is logged-in to the given WBA, the system is configured to automatically identify (e.g., based on the first database and the list of pending changes described above) at least one user whose access privileges to the given WBA are required to be changed (e.g., removed, added, or modified in case of several levels of access privileges). In case such a user exists, based on the second database (described above), the system is configured to use the browser to generate an API call to an application server running the given WBA, for changing the access privileges of the user in the given WBA. It is noted that no API call is generated in case the system does not identify a user account whose access privileges to the given WBA are required to be changed.

In some embodiments, the changing of access privileges of the respective account on behalf of the logged-in administrator may be carried out automatically (or semi-automatically as will be described below). In some embodiments, in the automatic mode, the system is further configured to notify the administrator (e.g., by email or by displaying a popup message) that the access privileges of the respective account have been automatically changed.

In other embodiments, the changing of access privileges of the respective account on behalf of the logged-in administrator may be carried out semi-automatically, for example, by notifying (e.g., using a popup message) the administrator of the given WBA of the changes required in the access privileges of the respective accounts, so that the administrator can approve the changes, or alternatively perform the change manually. Additionally, or alternatively, the system can provide the administrator of the given WBA with guidance of how to implement the changes required in the access privileges of the respective accounts. The guidance may comprise: (i) a set of operations that require the administrator's approval, or (ii) a set of operations that may walk the administrator through the process of performing the changes required in the access privileges of the respective accounts.

In some embodiments, in response to detecting that the administrator has logged-in, the system is configured to identify the user by: (i) sending from the browser to a security server, a query to check for users that are associated with the given WBA, and whose access privileges are required to be changed, and (ii) receiving from the security server information relating to the user in response to the query. In the present example the information comprises an email address, and an API internal code. In an example embodiment, the response from the server has the following format:

```
{
  "SHORTCUT__RULES": [
    {
      "contextResponsePathMap": {
        "emails.%TEMPLATE%.email__address": {
          "item": 900,
          "type": "string"
        },
        "api__internal__code": {
          "arg1": true,
          "item": 127,
          "arg1": true,
          "type": "boolean"
        }
      },
      "endpoint":
"https://app.com/api/private/user",
      "method": "GET",
      "name": "GetShortcutItems",
      "type": "AJAX__REQUEST"
    }
  ]
}
```

In some embodiments, in both automatic and semi-automatic modes, in response to the administrator logging-in, the system initiates a secure session with the given WBA, and changing the access privileges is performed as part of the secure session. The changing of access privileges comprises: (i) in response to detecting that the administrator has logged-in, the system is configured to obtain from the browser (e.g., using authentication credential stored in a cookie installed in the administrator browser), access-management API information of the given WBA, and (ii) access the given WBA using the obtained access-management API information. It is noted that: (i) cookie 26 is part of the data related to the given WBA that is stored within the web browser 22, (ii) the authentication credential is received from cookie 26, and (iii) the information stored in cookie 26 is being used to send API calls to the given WBA.

The disclosed techniques enable intervening in the operation of the browser in order to extract and export information on access to WBAs by the user, and then intervening in the actual access. As such, the disclosed techniques have technical effects, and are implemented in software and cannot practically be carried out by a person with pencil and paper. Moreover, the disclosed techniques are implemented for reducing opportunities for malicious or other unauthorized use of computer resources.

System Description

FIG. 1 is a block diagram that schematically illustrates a system 11 for managing user access in web-based applications, in accordance with an embodiment of the present invention.

In some embodiments, system 11 comprises a host computer 10, a security server 12, and an application server 14, which are all connected to and configured to exchange data over a data network 16, such as the internet.

In some embodiments, application server 14 is configured to run a plurality (e.g., between tens and thousands) of web-based applications (WBAs) of data network 16, such as a WBA 38, which are used by users (e.g., employees) of a given organization (e.g., a corporation) that have access privileges to the respective WBAs. Each of the WBAs (i) may be identified using a uniform resource locator (URL), which is indicative of the WBA being used, and serves as a reference to the respective WBA on the internet, and (ii) has at least one administrator that is eligible to manage several operations in the WBA, such as managing the access privileges of accounts of eligible users of the respective WBA (e.g., WBA 38).

In some embodiments, host computer 10 comprises a processor 18, a web browser 22, and one or more memory devices (not shown). Web browser 22 has a browser security add-on (BSA) 24 whose features are described below, and a cookie 26 comprising information for authenticating the access and privileges of the administrator of WBA 38.

In some embodiments, security server 12 comprises a processor 28 and a memory device, referred to herein as a memory 30.

In some embodiments, host computer 10 comprises a network interface (I/F) 19, which is configured to communicate information over data network 16, for example, (i) between processors 18 and 28 of host computer 10 and security server 12, respectively, and (ii) between processor 18 and application server 14 and more specifically with WBAs (e.g., WBA 38) running on application server 14.

In some embodiments, processors 18 and 28 comprise general-purpose processors, which are programmed in software to carry out the functions described herein. The software may be downloaded to host computer 10 and server 12, respectively, in electronic form, over any suitable network (e.g., network 16), for example, or it may, alternatively or additionally, be provided and/or stored on non-transitory tangible media, such as magnetic, optical, or electronic memory.

In some embodiments, security server 12 has (i) a user database (user DB) 32, (ii) an application programming interface (API) database (API DB) 34, and (iii) a list 36 of pending modification of user access privileges, which are stored in memory 30, and are configured to hold (e.g., store in memory 30) information as will be described herein.

In some embodiments, user DB 32 is configured to hold information of user (e.g., employee) accounts for all WBAs of application server 14. In other words, DB 32 is configured to hold a list of accounts of employees that are eligible to access and use the respective WBAs that are running on application server 14. For example, user DB 32 is configured to hold employee ID, WBA ID, user ID, and privileges of the accounts of each user (e.g., a simple user of WBA 38, or an administrator of WBA 38).

In some embodiments, API DB 34 is configured to hold information of user management API for the respective WBAs (e.g., WBA ID for referencing the WBA, operation such as remove/add/modify access privileges). The information from API DB 34 may be used to generate an API call. As such, an entity, such as processor 18 of host computer 10, is configured to communicate the API call over data network 16, e.g., via network interface 19, to application server 14, and thereby, processor 18 is configured to manage the access of an account to a respective WBA, such as WBA 38. In other words, API DB 34 holds information of instructions related to modifying access privileges in selected WBAs (e.g., in all WBAs ran by application server 14). For example, the API call may send a request to revoke access permissions to the application.

In some embodiments, list 36 of pending modification of user access privileges may be received from any eligible source within the organization. For example, (i) a first employee whose account has access privilege to WBA 38, is leaving the organization, and (ii) a second employee from the organization is intended to replace the first employee and to use WBA 38. In this example, list 36 receives an automatic update of the above information from the human resource (HR) department of the organization. In response to receiving the information, list 36 is updated with requests to: (i) remove, from WBA 38, the access privilege (i.e., credentials) of the account associated with the first user, and (ii) add, to WBA 38, the access privilege of the account associated with the second user.

In some cases, WBA 38 may have several levels of access privileges, for example, an engineer and his team leader may have different levels of access privileges. In an embodiment related to this example, when a given engineer of the team is promoted to a team leader position of the same team, list 36 may comprise a request to modify the level of access privileges to the account associated with the given engineer.

In a more general example, the access privileges may comprise: (i) a first level of access privileges granting the user to perform a first set of operations in WBA 38, and (ii) a second level of access privileges granting the user to perform a second set of operations (different from the first set) in WBA 38. In this example, changing the access privileges comprises changing the access privileges of the user from the first level to the second level.

In some embodiments, when the administrator of WBA 38 logs-in to WBA 38 via BSA 24 of web browser 22, processor 18 of host computer 10 is configured to send a query to processor 28 of security server 12. The query checks whether there are requests to modify access privileges to one or more accounts that are currently, or are intended to be, associated with WBA 38. It is noted that when another user of WBA 38, which is not the WBA 38 administrator, logs in to WBA 38, processor 28 identifies, based on DB 32, that s/he is not the administrator and lets her/him access the application without taking any action.

In some embodiments, in response to the query, processor 28 checks, based on information stored in (i) user database 32 (having all the accounts of the organization associated with the respective WBAs of application server 14), and (ii) list 36 (having all pending modifications of access privileges to accounts in all the aforementioned WBAs), whether there are accounts that require modification of access privileges in WBA 38.

In some embodiments, processor 28 is configured to intersect between the information in database 32 and in list 36, and based on the intersection, processor 28 is configured to send to processor 18: (i) a list of accounts associated with users of WBA 38, (ii) the modification(s) required in each of these accounts, and (iii) information from API DB 34, which is related to instructions of how to perform, in WBA 38, the required modifications in the respective accounts.

In some embodiments, based on the information received from processor 28, processor 18 is configured to generate an API call comprising the list of modifications in access privileges that are required in WBA 38 for the list of accounts identified by processor 28.

In some embodiments, based on the API call, changing the access privileges of the respective accounts, on behalf of the administrator while the administrator is logged-in, may be applied to WBA 38 using a fully automatic mode or a semi-automatic mode. In the fully automatic mode, processor 18 is configured to use the cookie 26, which authenticates the access to the administrator's account (and thereby "riding" on the administrator's account) to convey the API call, via data network 16, to WBA 38 in application server 14. In the semi-automatic mode, processor 18 is configured to (i) notify the administrator of WBA 38 (e.g., using a popup or any other suitable type of message) of the changes required in the access privileges of the respective accounts, and/or (ii) provide the administrator of WBA 38 with guidance of how to implement, in WBA 38, the changes required in the access privileges of the respective accounts.

In the context of the present disclosure and in the claims, the sentence "on behalf of the logged-in administrator" refers to (i) provide the administrator of WBA 38 with a message indicative of the one or more operations required to carry out the changes required in the access privileges of one or more accounts to a given WBA (e.g., WBA 38), so that the administrator can approve or reject these changes, or alternatively, (ii) perform the changes in the access privileges of the one or more accounts to the given WBA automatically, and send a message to the administrator indicative that the changes have been performed.

It is noted that in the semi-automatic mode, processor 18 is further configured to (i) automatically identifying one or more users (i.e., user accounts) whose access privileges to the given WBA (e.g., WBA 38) are required to be changed, and (ii) guide the administrator how to manually change these access privileges in WBA 38.

Figure 2:
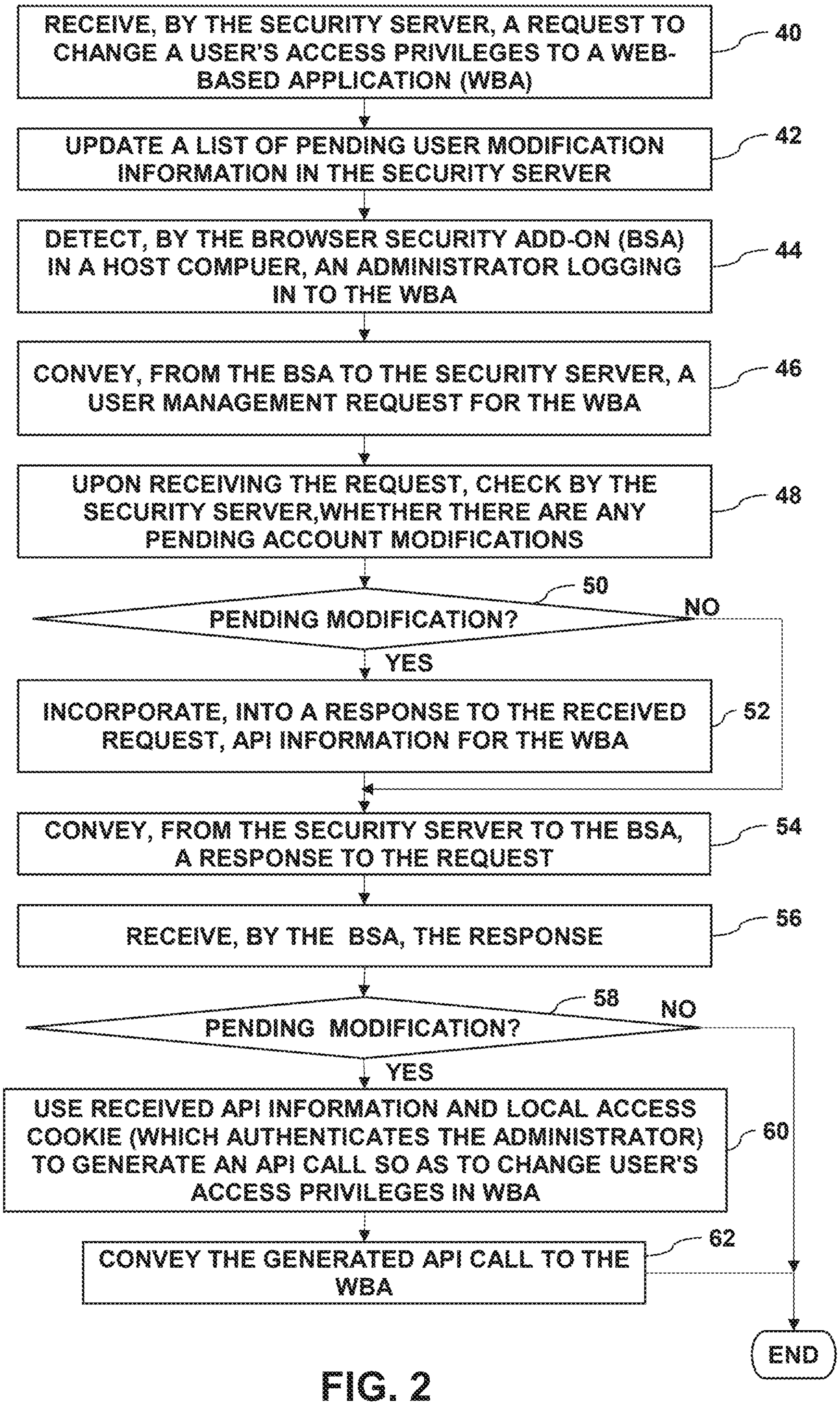
FIG. 2 is a flow chart that schematically illustrates a method for managing user access in web-based applications, in accordance with an embodiment of the present invention.

FIG. 2 is a flow chart that schematically illustrates a method for managing user access in web-based applications such as WBA 38, in accordance with an embodiment of the present invention.

The method begins at a request receiving step 40, with security server 12 receiving a request (e.g., from the HR department or from any other certified source that is predefined in the system) to change access privileges of a user account to WBA 38, as described in detail in FIG. 1 above.

At a list updating step 42, processor 28 is configured to update list 36 (of pending user modification information) for WBA 38, as described in detail in FIG. 1 above.

At a login detection step 44, BSA 24 is configured to detect that the administrator of WBA 38 has logged in to WBA 38. To this end, BSA 24 is configured to send a request back to security server 12, providing metadata about the user, and receives, from security server 12, a logging-in indication.

In some embodiments, BSA 24 is configured to detect that the logged in user is an administrator of the WBA 38 using some techniques. For example, the API call is sent to WBA 38 to get the respective user's information and to determine whether the logged in user is an administrator, e.g., by asking the user whether s/he is an administrator of the application. In other words, the same concept of sending API calls to the WBA 38 can be used in order to check whether the user is an administrator of the respective WBA 38.

At a user management requesting step 46, BSA 24 is configured to convey to security server 12, a user management request for WBA 38, as described in detail in FIG. 1 above.

It is noted that when another user of WBA 38, which is not the administrator, logs in to WBA 38, processor 28 is configured to identify based on DB 32, that the user is not the administrator and does not trigger step 46 or any of the action described below.

At a pending modification checking step 48, processor 28 is configured to check in list 36 whether or not there are pending account modifications in WBA 38.

At a first decision step 50, in some embodiments, in case there is at least one pending modification for WBA 38, the method proceeds to an API information incorporation step 52, with processor 28 is configured to respond to the request by incorporating, API information for WBA 38.

In other embodiments, in case there is no pending modification for WBA 38, the method directly proceeds to a response conveying step 54, in which processor 28 conveys the response (with or without the API information, as described in steps 50 and 52 above) to BSA 24 (e.g., via processor 18 of host computer 10).

At a response receiving step, BSA 24 receives the response to the request for user management information described in steps 46 and 48 above.

At a second decision step 58, processor 18 is configured to check whether any pending modifications have been received in the response to the request, as described above.

In case there are no pending modifications, the method terminates. Alternatively, in case there are pending modifications, the method proceeds to an API call generation step 60. At step 60, based on (i) the API information generated in step 52, and received in step 56, and (ii) cookie 26 that enables the authentication to the administrator's account, processor 18 is configured to generate, an API call in order to change the requested access privileges of one or more accounts in WBA 38, as described in detail in FIG. 1 above.

At an API call conveying step 62 that concludes the method, processor 18 conveys the API call using either (i) the fully automatic mode (e.g., directly to application server 14) without requesting an intervention of the WBA 38 administrator, or (ii) the semi-automatic mode, in which processor 18 (*i*) notifies the administrator of WBA 38 (e.g., using a popup or any other suitable type of message) of the changes required in the access privileges of the one or more respective accounts, and/or (ii) provides the administrator of WBA 38 with guidance of how to implement, in WBA 38, the changes required in the access privileges of the one or more respective accounts.

Although the embodiments described herein mainly address user access management for web-based applications, the methods and systems described herein can also be used in other applications, such as in any variation that requires learning and/or modifying data of a non-managed application, such as multi-factor authentication (MFA).

It will thus be appreciated that the embodiments described above are cited by way of example, and that the present invention is not limited to what has been particularly shown and described hereinabove. Rather, the scope of the present invention includes both combinations and sub-combinations of the various s described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A method, comprising:

in a browser running on a computing device, detecting that an administrator, of a given web-based application (WBA) among multiple WBAs, has logged-in to the given WBA; and while the administrator is logged-in:

automatically identifying a user whose access privileges to the given WBA are required to be changed by sending from the browser to a server, in response to detecting that the administrator has logged-in, a query for users that are associated with the given WBA and whose access privileges are required to be changed, and receiving from the server information relating to the user in response to the query; and changing the access privileges of the user in the given WBA by the browser, on behalf of the logged-in administrator, by automatically changing the access privileges on behalf of the logged-in administrator using a cookie to authenticate the administrator, wherein automatically changing the access privileges comprises:

in response to detecting that the administrator has logged-in, obtaining from a server to the browser, access-management Application Programming Interface (API) information of the given WBA; and accessing the given WBA using the obtained access-management API information.

2. The method according to claim 1, wherein, in logging-in, the administrator initiates a secure session with the given WBA, and wherein changing the access privileges is performed as part of the secure session.

3. The method according to claim 1, wherein changing the access privileges comprises displaying, to the administrator, a message indicative of the user whose access privileges to the given WBA are required to be changed.

4. The method according to claim 3, further comprising providing the administrator with instructions for changing the access privileges of the user in the given WBA.

5. The method according to claim 1, wherein changing the access privileges comprises deleting the access privileges of the user to the given WBA.

6. The method according to claim 1, wherein changing the access privileges comprises granting the user new access privileges to the given WBA.

7. The method according to claim 1, wherein the access privileges comprise: (i) a first level of access privileges allowing the user to perform a first set of operations in the given WBA, and (ii) a second level of access privileges granting the user to perform a second set of operations in the given WBA, different from the first set, wherein changing the access privileges comprises changing the access privileges of the user from the first level to the second level.

8. The method according to claim 1, wherein detecting that the administrator has logged-in to the given WBA is performed by a browser security add-on of the browser.

9. The method according to claim 8, wherein automatically changing the access privileges comprises generating, by the browser security add-on, an API call using the obtained access-management API information and the cookie, and conveying the generated API call to the given WBA.

10. A system, comprising:

a network interface, which is configured to communicate over a data network with one or more web-based applications (WBAs); and a processor, which is configured to run a browser, and detect in the browser that an administrator, of a given web-based application (WBA) among the WBAs, has logged-in to the given WBA, and while the administrator is logged-in: the processor is configured to:

(a) automatically identify a user whose access privileges to the given WBA are required to be changed by sending from the browser to a server, in response to detecting that the administrator has logged-in, a query for users that are associated with the given WBA and whose access privileges are required to be changed, and receiving from the server information relating to the user in response to the query; and (b) change, via the network interface, the access privileges of the user in the given WBA by the browser, on behalf of the logged-in administrator, by automatically changing the access privileges on behalf of the logged-in administrator using a cookie to authenticate the administrator, wherein the processor is configured to automatically change the access privileges on behalf of the logged-in administrator by:

in response to detecting that the administrator has logged-in, the processor is configured to obtain from a server to the browser, access-management Application Programming Interface (API) information of the given WBA; and accessing the given WBA using the obtained access-management API information.

11. The system according to claim 10, wherein, in response to the logging-in of the administrator, the processor is configured to initiate a secure session with the given WBA, and wherein the processor is configured to change the access privileges as part of the secure session.

12. The system according to claim 10, wherein the processor is configured to change the access privileges on behalf of the logged-in administrator by displaying, to the administrator, a message indicative of the user whose access privileges to the given WBA are required to be changed, and changing the access privileges (i) by the logged-in administrator, or (ii) on behalf of the logged-in administrator.

13. The system according to claim 12, wherein the processor is configured to provide the administrator with instructions for changing the access privileges of the user in the given WBA.

14. The system according to claim 10, wherein, in changing the access privileges, the processor is configured to delete the access privileges of the user to the given WBA.

15. The system according to claim 10, wherein, in changing the access privileges, the processor is configured to grant the user new access privileges to the given WBA.

16. The system according to claim 10, wherein the access privileges comprise: (i) a first level of access privileges granting the user to perform a first set of operations in the given WBA, and (ii) a second level of access privileges allowing the user to perform a second set of operations in the given WBA, different from the first set, and wherein, in changing the access privileges, the processor is configured to change the access privileges of the user from the first level to the second level.

17. The system according to claim 10, wherein the browser comprises a browser security add-on, and wherein the browser security add-on is configured to detect that the administrator has logged-in to the given WBA.

18. The system according to claim 17, wherein the browser security add-on is configured to automatically change the access privileges by generating an API call using the obtained access-management API information and the cookie, and conveying the generated API call to the given WBA.

19. A non-transitory computer-readable medium storing instructions that, when executed by a processor of a computing device running a browser, cause the computing device to perform operations comprising:

detecting that an administrator, of a given web-based application (WBA) among multiple WBAs, has logged-in to the given WBA; and while the administrator is logged-in:

automatically identifying a user whose access privileges to the given WBA are required to be changed by sending from the browser to a server, in response to detecting that the administrator has logged-in, a query for users that are associated with the given WBA and whose access privileges are required to be changed, and receiving from the server information relating to the user in response to the query; and changing the access privileges of the user in the given WBA by the browser, on behalf of the logged-in administrator, by automatically changing the access privileges on behalf of the logged-in administrator using a cookie to authenticate the administrator, wherein automatically changing the access privileges comprises:

in response to detecting that the administrator has logged-in, obtaining from a server to the browser, access-management Application Programming Interface (API) information of the given WBA; and accessing the given WBA using the obtained access-management API information.

20. The non-transitory computer-readable medium according to claim 19, wherein detecting that the administrator has logged-in to the given WBA is performed by a browser security add-on of the browser.

* * * * *